Sept. 11, 1923.

W. TAYLOR
GRINDING MACHINE.
Filed Oct. 28, 1916

INVENTOR.
William Taylor
BY
his ATTORNEY

WITNESSES:

Sept. 11, 1923.

W. TAYLOR

GRINDING MACHINE

Filed Oct. 28, 1916

INVENTOR.
William Taylor
BY
Arthur L. Rawl
his ATTORNEY

Sept. 11, 1923.

W. TAYLOR

GRINDING MACHINE

Filed Oct. 28, 1916

WITNESSES:

INVENTOR.
William Taylor
BY
ATTORNEY

Patented Sept. 11, 1923.

1,467,518

UNITED STATES PATENT OFFICE.

WILLIAM TAYLOR, OF LEICESTER, ENGLAND.

GRINDING MACHINE.

Application filed October 28, 1916. Serial No. 128,237.

*To all whom it may concern:*

Be it known that I, WILLIAM TAYLOR, a citizen of Great Britain, residing at Leicester, in the county of Leicestershire, England, have invented certain new and useful Improvements in Grinding Machines, fully described and represented in the following specification and the accompanying drawings, forming a part of the same.

This invention relates to machines for grinding glass and other material, and more particularly for grinding the peripheries of disc like objects such as lenses, and the object of the invention is generally to provide an improved machine of this class whereby rapidity and accuracy of grinding resulting in a largely increased output of accurately ground work may be obtained without requiring the employment of highly skilled operators.

More particularly, the invention aims, among other things, to provide a machine in which the setting and removal of the work to be ground may be readily effected with rapidity and accuracy; to provide a machine adapted both for grinding a cylindrical edge on a disc or lens, and for chamfering or bevelling the edge of the lens at any desired angle; to provide means for suitably controlling and for varying as desired the rate of rotation of the work; to provide means for accurately positioning the work with relation to the grinding wheel and for moving it rapidly away from the wheel, and for slowly moving it into operative position; to provide means for rapidly and accurately centering and mounting the work on the work spindle, and to provide means for rapidly and accurately trueing up or forming to any desired shape the face of the grinding wheel.

The invention has been made more particularly with the idea of providing an organized machine for grinding glass in accordance with my terrace grinding method, as set forth in my application for U. S. patent, filed October 28th, 1916, Serial No. 128,235, in accordance with which method the grinding wheel and the glass to be ground are so set and moved relatively that an abrupt step is formed between the ground and unground portions of the work, which step is ground continuously backward by a process of splintering of the glass adjacent to and just beyond the step under the action of the grinding wheel the pressure of which is against the side of the step. The invention is, however, not limited in its application to such terrace grinding, although in following such method the most efficient operation is attained.

In order to obtain a maximum output from the machine, the cutting or grinding should always proceed at a maximum quantity of material removed per unit of time, and if the original peripheral surface of a disc or lens as presented to the grinding wheel were cylindrical this could be accomplished with a uniform rate of rotation of the work spindle.

Lenses when mounted ready for edge grinding, however, usually have their contour more or less eccentric to the axis of rotation, so that the depth of the step or terrace will vary at different points; and different lenses may be of different diameter and thickness and of different quality of glass, and each of these variables must be considered in determining the proper speed of rotation of the work spindle. The usual methods of rotating work to be ground do not meet the conditions of maximum production, and are apt to cause damage to the work in the event of its grinding wheel being in improper or blunt condition.

I have found it desirable to provide means for driving or rotating the work spindle which may be adjusted to vary the speed to suit the diameter, thickness and character of the glass, and with which the speed or rate of rotation will vary automatically in accordance with variation in the depth of cut or step, so as to maintain at all times a maximum or desired rate of material removed, and which will also prevent excessive speed such as would injure the work at any time, as when the depth of cut suddenly diminishes, or in the event of the grinding wheel being in improper or blunt condition in terrace grinding.

My invention accomplishes these results, by providing a driving means of constant force sufficient in amount to cause rotation of the work at a predetermined rate suitable for grinding a maximum depth of cut when the wheel is in proper condition, but not sufficient to cause damage to the work when the wheel becomes blunt, and separate retarding or controlling means for limiting the rate of rotation to such predetermined rate, such means together with the varying resistance offered by the work also causing an automatic variation of speed according to the depth of cut or work to be done. Rotation of the work in this manner may appropriately be termed controlled, or permissive rotation.

A full understanding of the invention can best be given by a detailed description of an approved construction embodying the various features of the same, and such a description will now be given in connection with the accompanying drawings; in which Fig. 1 is a front elevation of a machine embodying the features of my invention;

Fig. 4 is a side elevation of a crutch or frame for centering and mounting the work on the spindle;

Fig. 5 is a side and edge elevation of the driving wheel and clutch used for rotating the work spindle;

Fig. 6 is a detail view of a spindle or holder for a diamond tool for turning the end or face of the abrasive wheel;

Fig. 7 is a detail sectional view of the dash pot 37 taken on line 7—7 of Fig. 1.

Figure 1:
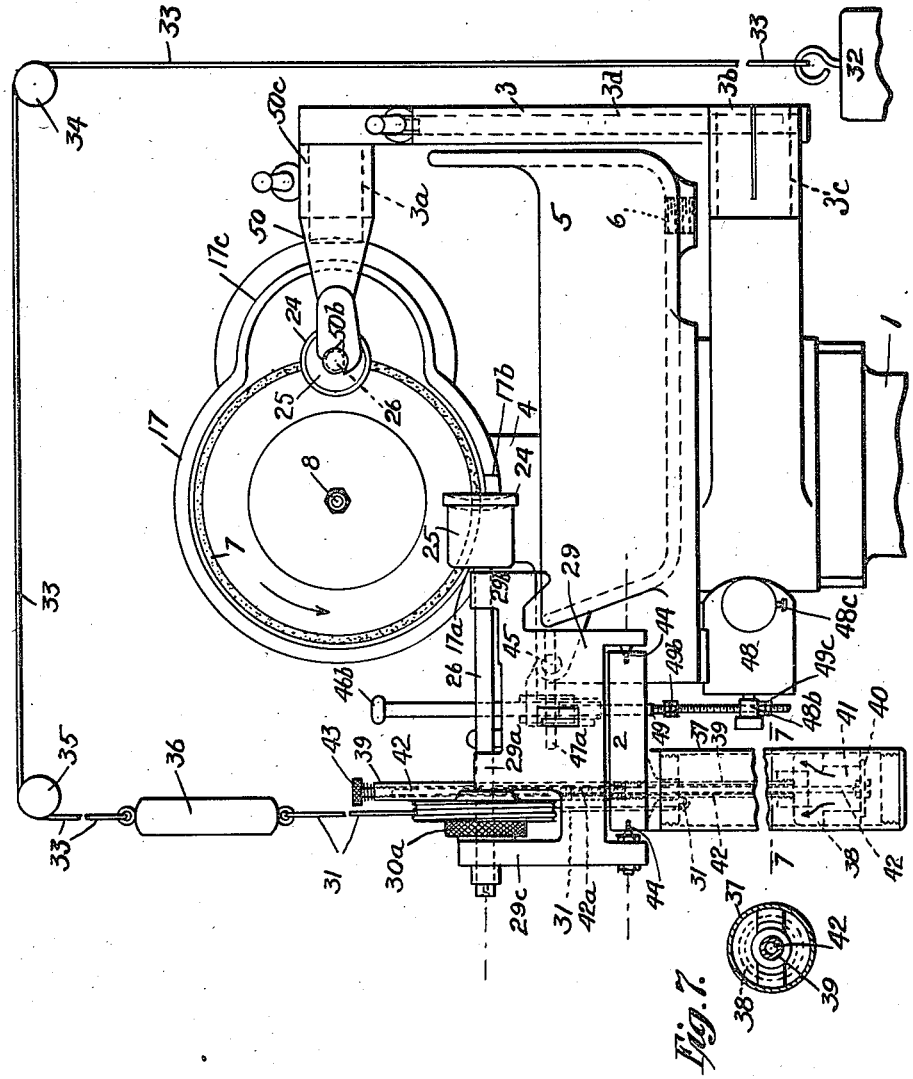

In the drawings, 1 is a column for supporting the machine, and 2 is a base or bed bolted to the top of the column and carrying the various operating mechanisms. On one side the bed carries a swinging arm or support 3 which carries the mechanism for supporting the work for chamfering or beveling, and on the other side the bed carries mechanism for supporting the work for cylindrical grinding, and the bed also carries an upwardly extending support 4 for the abrasive wheel spindle, and a pan 5 formed integral therewith and adapted to catch the water and detritus from the grinding operations. The pan has an outlet 6 which may be piped to drain away such water in any convenient manner.

The abrasive wheel 7, which I prefer to make of cylindrical cup form to provide an annular grinding edge, is mounted in the usual manner on a spindle 8 carried in bearings 9 and 10 which may be provided with any suitable means of adjustment for wear and which most desirably have spherical exteriors to cooperate with spherical seatings 11 and 12 to facilitate alignment. The seatings 11—12 form a part of or are carried by a sliding frame 13 which may be moved in the direction longitudinal of the spindle 8 by means of a screw 14 and crank handle 15. The spindle 8 is provided with a pulley 16 by which it may be driven by a belt from any convenient source of power.

Encircling the wheel 7 is a guard 17 centered and supported by a disc 18 carried by the slide 13 concentrically with the axis of the spindle 8. Attached to the guard 17 is a threaded member 19 passing through lugs 20 and 21 and carrying between the lugs a threaded nut 22 by which the member 19 and with it the guard 17 may be moved longitudinally of the spindle 8. This adjustment is used to set the edge of the guard to overhang slightly the front edge $7^a$ of the wheel 7 so that it catches the water discharged by the centrifugal action of the wheel. The overhanging edge of the guard is cut back between the points $17^a$ and $17^b$ to permit entrance to the wheel of the work and chuck hereafter described. The guard 17 also has an extension $17^c$ provided to give access of the work to the wheel for chamfering or beveling the edge of the disc or lens in the manner hereafter described.

In order to keep the wheel and the work cool during grinding, I use a cooling liquid as is usual in grinding operations, but I find that in grinding glass, instead of directing the stream of cooling liquid on the work at or near the point of contact with the wheel it is sufficient and preferable to direct a jet of liquid through a pipe 23 which may be carried by the wheel guard 17 on to the inner face of the cup or its mounting at a point somewhat near its axis where the velocity is relatively low, and from whence it spreads by centrifugal action over the active abrasive surface of the wheel. The direction of the rotation of the wheel is not essential but in the construction shown it rotates in the direction of the arrow in Fig. 1.

Each machine is provided with a plurality of interchangeable work spindles which may have work mounted upon them without interruption of the grinding operation. The lens or disc 24 whose periphery is to be ground, I attach, generally by means of cement in a manner well known to opticians, to a tubular chuck 25 fixed at one end of a spindle 26.

Such mounting is most desirably accomplished with the attachment or device shown in Fig. 4. A frame or support 28, which may be fastened to the bed plate 2, or, if desired, to a work bench 27, carries the half open bearings $28^a$ and $28^b$, and a center $28^c$ which is adapted to engage corresponding centers in the spindles 26. The frame 28 is set as shown somewhat inclined to the vertical, so that the spindle 26 may fall and rest by gravity in the bearings $28^a$ and $28^b$ with but little friction therein, and may be turned by the operator's left hand fingers rolling the spindle about its axis. Fixed on the frame 28 is a hand rest $28^d$ to support the operator's right hand during the operation of centering a lens 24 on the chuck 25 so that the optical axis of the lens is in line with the axis of rotation of the chuck and spindle by watching images reflected from the lens surface in the manner well known to opticians. With this attachment, work may be rapidly and accurately mounted on the extra work spindles, while the grinding machine is in operation, thus largely increasing the output of the machine.

A spindle with chuck and work thus attached is placed in the grinding machine in a spindle carrier or crutch 29, which has two open bearings 29ª and 29ᵇ, each comprising a horizontal surface upon which the spindle rests by gravity and a vertical surface which engages the side of the spindle opposite to the wheel 7. In the position shown in Figures 1 and 3, which is suitable for grinding a cylindrical edge on the work, the axis of the spindle 26 should be parallel to the plane of the end of the abrasive wheel 7 and distant from the axis of the wheel an amount substantially equal to the radius of the wheel. The axis of the wheel should also lie near to the median plane of the work or lens.

The free end of the spindle 26 remote from the work 24 passes through a driving wheel or pulley 30 loosely housed in the crutch or carrier 29 between the bearing 29ª and a lug 29ᶜ which confine it against end movement and prevent end shake, but radially the pulley is positioned by the spindle 26. On the hub of the pulley 30 is a collar 30ª having a clutch formed within it by means of a roller 30ᶜ confined in a short interval spiral or eccentric groove 30ᵇ. The direction of slant of the spiral groove is such that the clutch seizes the spindle 26 on forward rotation of the wheel 30, and releases the spindle 26 upon backward rotation of the wheel 30 leaving the wheel free to rotate on the spindle 26 and allowing the spindle to move freely longitudinally.

Endwise movement of the spindle 26 while grinding is taking place, is prevented by the position of the pulley 30 between the bearing 29ª and the lug 29ᶜ, the pulley during the grinding process being locked to the spindle 26 by the clutch above described and prevented from moving longitudinally by its housing in the carrier 29. As the clutch seizes the spindle only during forward rotation of the pulley 30, the spindle may be freely moved longitudinally to position the work in proper relation to the wheel 7 while the pulley 30 is stationary.

Rotation of the work spindle at a slow but variable and controlled rate suitable for grinding by forming a step across the edge of the disc and grinding such step progressively backward as the disc rotates, whether this be accomplished by the terrace grinding method of my application No. 128,235, hereinbefore referred to, with the formation of an abrupt step, or by ordinary abrasive grinding, is best secured by means causing rotation of the pulley 30 and work spindle under a limited force and limiting the rotation to a rate which cannot exceed a desired maximum and which will vary with varying resistance due to varying depth of cut. In the construction shown, the pulley 30 is driven by a cord 31 which may lie in a spiral groove formed in the face of the pulley, and which is acted upon by a weight 32 through a cord 33 carried over pulleys 34 and 35 suspended overhead at a convenient distance, the cord 33 being attached to a handle 36 and thereby to the upper end of the cord 31. On the lower end of the cord 31 is suspended the cylinder 37 of an oil dash pot, having within it a freely sliding piston 38 held suspended from the bed 2 by a pipe 39 and provided with a valve 40 capable of closing a port 41 connecting the spaces in the cylinder above and below the piston. The valve 40 is suspended on a central rod 42 which passes upward through the pipe 39 and abuts against an adjusting screw 43 at the upper end thereof, by which the rod may be moved so as to set the valve 40 more or less open and thereby vary the rate at which oil in the cylinder 37 can pass from below to above the piston 38. A spring 42ª just supports the weight of the valve 40 and push rod 42, but leaves them otherwise free to permit passage of the oil from above to below the piston.

The action of this driving and controlling mechanism is as follows: Upon the handle 36 being pulled downwards by the operator, the weight 32 is lifted, and the cylinder 37 is permitted by the cord 31 to fall, thereby rotating the pulley 30 backwards, and during such fall the oil passes from above the piston 38 through the port 41 and past the valve 40 into the cylinder space below the piston. Upon releasing the handle 36, the weight 32 acts through the cord 33 and tends to rotate the pulley 30 with the work spindle and work through the medium of the clutch 30ᶜ (which acts only in this direction of rotation), such rotation being, however, controlled and its rate limited by the action of the dash pot. The rate at which the work may be thus permissively rotated can be varied by adjusting the screw 43 acting on the dash pot valve 40. This permitted rate of rotation is, however, determined not wholly by the resistance due to the dash pot, but also partly by the resistance of the work itself. The weight 32 which supplies the force for rotating the spindle should, as before pointed out, be sufficient to cause in the construction shown rotation at a predetermined or desired rate sufficient for grinding with the maximum depth of cut when the wheel is in proper condition. The actual rate of rotation will then be controlled and limited by the resistance due in part to the dash pot and in part to the work itself, and with varying work resistance, as with variation in the depth in the step or terrace being ground, the rate of work rotation will vary automatically, being slow where the step is deep and faster where the step is shallow, with the dash pot resistance at all times preventing an excessive rate even where there is little or no work to be done. Such automatic variation in rate of rotation depends, of course, upon the weight being not overpoweringly great, as, if such were the case, the varying influence of the amount of work would be small and the rate of rotation under the control of the dash pot alone would be nearly constant, resulting in a dangerously high rate of rotation for deep cutting with the dash pot adjusted to permit a rate suitable for more shallow cutting.

The radius of the cylinder ground on the work depends upon the distance between the axis of the spindle 26 and the plane of the annular edge $7^a$ of the grinding wheel, and this may be varied by adjusting the wheel longitudinally of its axis by moving the sliding member 13 by means of the screw 14.

To provide the sensitive adjustment required for this class of work, however, and to facilitate withdrawal of the finished work from the wheel and replacement of fresh work, the spindle carrier 29 is pivotally mounted on an axis parallel to the work spindle axis and to the plane of the annular edge $7^a$ of the wheel, as by mounting it in centers 44 on the bed 2. A tension spring 45 acting between the bed 2 and the carrier 29 tends to swing the carrier with the work toward the wheel 7, such movement being limited and the carrier and work positioned by a micrometerstop or abutment $45^a$. By adjustment of the micrometerstop, the position of the carrier and the radius of the finished work may be varied by any required small amount.

For withdrawing the carrier 29 with the work from the wheel when desired, toggle levers 46 and 47 are provided, one pivoted at $46^a$ to the bed 2, and the other pivoted at $47^a$ to the carrier, the lever 46, which is pivoted to the bed, being extended and bent forward to provide an operating lever having its hand end $46^b$ convenient to the operator. By lifting the handle $46^b$, the toggle levers are caused to rock the carrier 29 forward against the action of its spring 45 until the junction pivot $47^b$ of the toggle has been moved past the dead center line, at which time further movement is prevented by a stop $46^c$, and the spring 45 then holds the carrier 29 and the work in this withdrawn position where the work spindle may be exchanged for another spindle carrying fresh work.

In order to hold the spindle 26 in the bearings $29^a$ and $29^b$ of the carrier when the carrier is swung up to support the spindle in operative position, while leaving it free for removal and replacement when the carrier is rocked forward, a flat spring $2^a$ is provided fixed to the frame or bed of the machine at $2^b$, and adapted when the carrier is in grinding position to press the spindle 26 with sufficient force and at an angle suitable to hold the spindle firmly to its bearings.

In order to prevent a fresh piece of work being carried suddenly against the abrasive wheel with resulting damage, I provide a check 48, which may be of the ordinary liquid door check type, having a crank arm $48^a$ carrying a crank pin $48^b$ through the end of which a threaded connecting rod 49 pivoted at $49^a$ to the lever 46 is free to slide, and also having a by-pass valve $48^c$ for varying the speed of operation of the check. Nuts $49^b$ and $49^c$ on the rod 49 are set so as to encounter the crank pin $48^b$ after the lever 46 is moved in either direction, so that upon withdrawing the work from the wheel the check 48 is set for action, and upon releasing the toggle levers 46 and 47 the check acts against the spring 45 to retard the forward movement of the carrier and to cause a slow final movement of the work toward the wheel at a rate which may be varied by adjusting the by-pass valve $48^c$.

Figure 2:
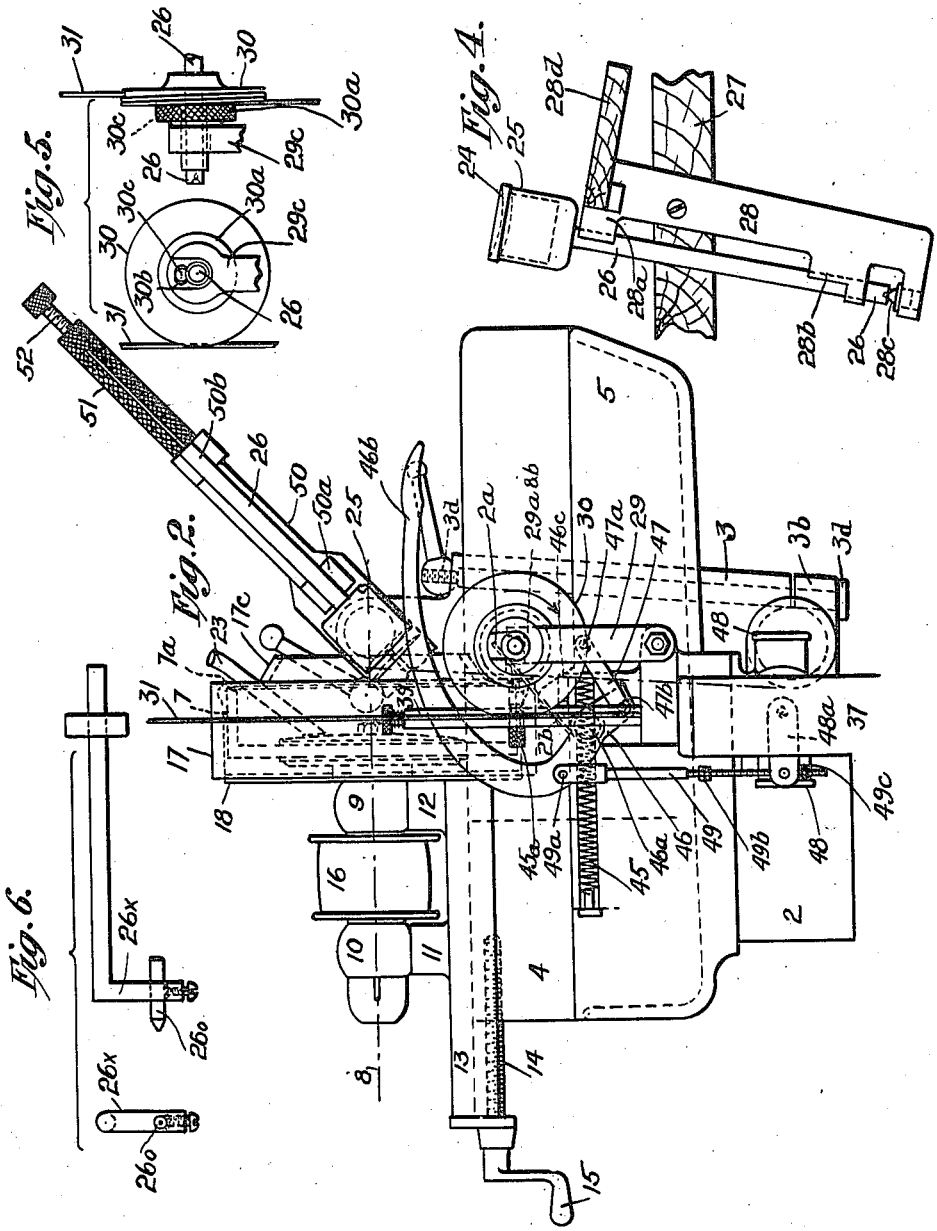
Fig. 2 is a side elevation of the upper portion of the machine.

As shown in Fig. 1, the work spindle 26 in the carrier 29 is set with its axis tangent to the cylindrical exterior of the wheel 7, and the work is rotated in the direction of the arrow on Fig. 2 so that the grinding is done by that portion of the cylindrical exterior of the wheel which is adjacent to its edge $7^a$.

The operation of grinding the edge of a lens or other disc with the apparatus above described will be understood generally from the foregoing description. In grinding with a cup-shaped or other grinding wheel having a cylindrical portion providing an annular grinding edge, it is usually desirable to grind the edge of the lens or other disc to the desired size in a single complete rotation of the disc, and the means for carrying and rotating the work spindle shown and described are especially intended and adapted for grinding in this way. When the spindle carrying the disc to be ground has been positioned in the carrier by placing it in the carrier bearings and then moving it endwise to pass its end through the driving pulley 30 and to position it so that the work will be properly presented to the edge of the grinding wheel, and the hand lever $46^b$ has been thrown upward to rock the carrier up into operating position, the carrier will, after its first comparatively rapid movement, move slowly under the pull of the spring 45 and control of the check 48 to carry the edge of the work against the grinding edge of the rapidly rotating grinding wheel. Such slow movement of the carrier will continue until stopped by the micrometerstop $45^a$, and the edge of the grinding wheel sweeping across the peripheral face of the disc will cut into the same to an extent determined by the position of the micrometerstop, which is set according to the size to which the disc is to be ground. The work spindle is then caused to rotate in the manner already described, and such rotation continues until a complete rotation has been made to complete the grinding of the periphery of the disc.

In order to provide means for grinding bevels on objects such as lenses, the machine is provided with a second spindle carrier or crutch 50 having open bearings 50ª and 50ᵇ wherein a work spindle 26 with its chuck and work thereon may be placed and rotated manually in suitable angular engagement with the edge of the grinding wheel, and with the spindle approximately parallel to the vertical plane of the axis of the grinding wheel.

The carrier 50 is mounted on the swinging arm or support 3 and is swivelled to turn about a horizontal axis approximately at right angles to the grinding wheel axis, being as shown mounted by means of a sleeve or hub 50ᶜ on an arbor 3ª, the sleeve being split and provided with a screw 50ᵈ by which it may be clamped to the arbor to hold the carrier in any position to which it may be turned. The arm 3 is mounted by means of a sp'it hub 3ᵇ at its lower end to swing on an arbor 3ᶜ about an axis parallel to the pivotal axis of the carrier, and is clamped in position by a screw 3ᵈ. By swinging the arm 3 the carrier 50 may be moved toward or from the grinding wheel, and by turning the carrier on the arbor 3ª it may be adjusted to support the work spindle at a suitable angle for grinding on the edge of a disk or lens a bevel of any desired angle. The carrier is shown in Figs. 1 and 3 as set to support the spind'e in horizontal position, but in Fig. 2 it is shown as turned to support the spindle at an angle of 45° to the end plane of the grinding whee'.

In order to provide a convenient handle for rotating the work spindle 26 in the carrier 50 during the bevelling process, and to provide a longitudinal feed and adjustment of the spindle 26 for varying the amount of bevel, there is provided a knurled sleeve 51 threaded internally for a screw 52 at one end, and bored in from the other end to receive the spindle 26 freely, and sawed longitudinally from the bored end and part'y closed together so that when pushed on the end of a spindle 26 it will grip the spindle frictionally. The end of the spindle abuts against the end of the screw 52. The spindle fitted with the sleeve 51 is placed in the bearings of the carrier, and during the bevelling operation the end of the sleeve 51 is set against the outer end of the bearing 50ᵇ so as to limit the advance of the work toward the wheel, and the screw 52 is used for fine adjustment of the work to the edge of the grinding wheel and to advance the spindle to any required extent.

The bearings 50ª and 50ᵇ of the carrier 50 are most desirably of V form, as shown in Fig. 1, so that the spindle may be readily placed therein or withdrawn (it being held therein by hand), and shall not be subject to looseness as the result of wear.

Figure 3:
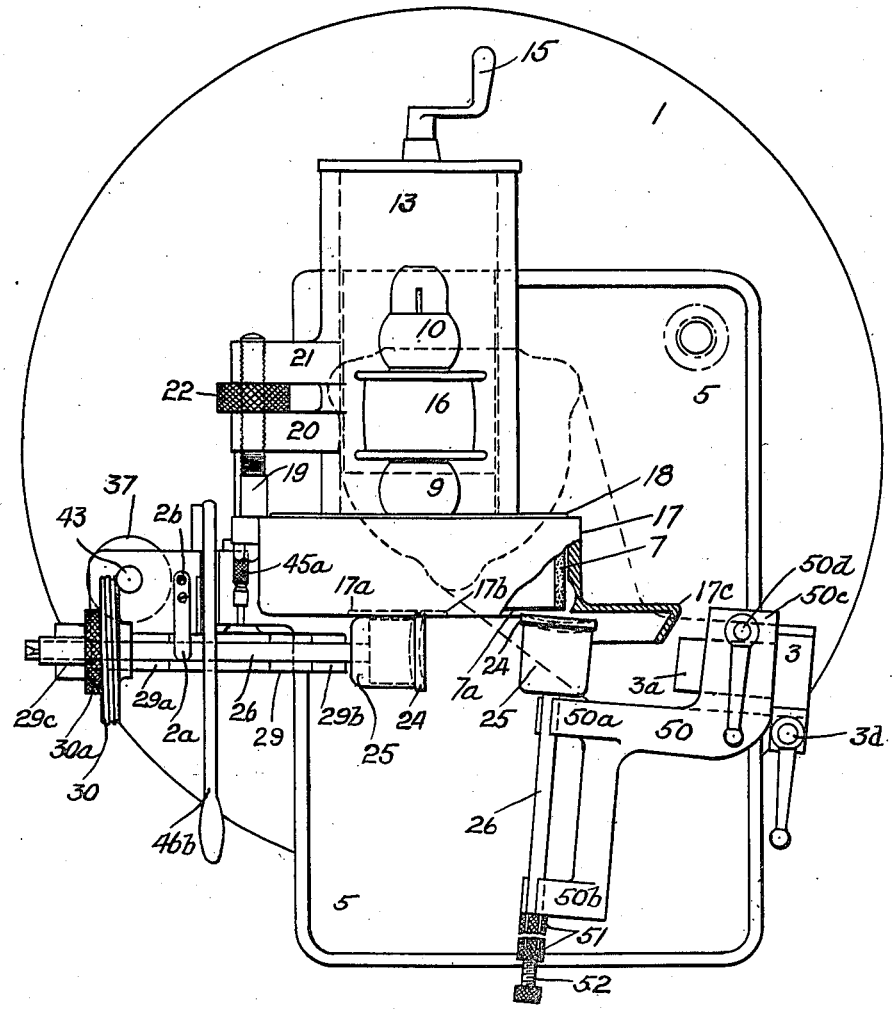
Fig. 3 is a plan view of the machine.

The axes of the pivot of the arm 3 and the arbor 3ª are preferably set, as shown in Fig. 3, at a small angle, of usually about five degrees, to the end plane of the wheel 7, so that by placing in the carrier 50, when the same is in the horizontal position shown in Figs. 1 and 3, a shaft or spindle 26ˣ (Fig. 6) having a short crank arm at one end and a diamond 26° projecting therefrom like a crank pin, the end 7ª of the wheel 7 may be trued up by the diamond and shaped slightly concave to provide a clearance between it and the surface formed on the glass, such as is desirable in the terrace grinding set forth in my said application No. 128,235.

It is to be understood that the invention is not to be limited to the exact construction, arrangement and combination of parts shown and to which the foregoing description has been largely confined, but that it includes changes and modifications thereof within the claims, and that parts of the apparatus c'aimed may be used in combination with other parts differing from those shown or in grinding machines of other types and construction.

What is claimed is:

1. In apparatus for grinding the peripheries of discs, the combination of a rotary abrasive wheel, a spindle adapted to carry the disc to be ground rotatable about an axis at an angle to the axis of rotation of the wheel, yielding means for causing a relative approaching movement between the spindle and the wheel along a line extending from the center of the disc to the point of contact between the disc and the wheel, and means for rotating the disc so as to cause its periphery to traverse the abrading surface of the wheel at an angle to the direction of movement of said surface, said rotating means containing an element adapted to yield during the grinding operation.

2. In grinding apparatus, the combination of a rotary grinding wheel, rotary work-holding means, yielding means for producing a relative approaching movement between said grinding wheel and said work-holding means, and toggle links for producing a relative separating movement between said grinding wheel and said work-holding means, said toggle links being movable past a dead center so as to prevent relative approaching movement between said grinding wheel and said work-holding means.

3. In grinding apparatus, the combination of a cup-shaped grinding wheel, a spindle carrier pivoted to a fixed support at one side of said wheel, a work-carrying spindle rotatably mounted on said carrier, a spring connected to said carrier and adapted to swing same about its pivot to move said spindle towards the grinding surface of said wheel, an adjustable stop for limiting the movement of said carrier towards said wheel, and a toggle lever fulcrumed to a fixed support and a link connecting said lever to said pivoted carrier, said link and lever providing means for moving said carrier away from said grinding wheel in opposition to the force of said spring, said link and lever being movable beyond a dead center position whereby they act to lock said carrier in a position removed from said wheel.

4. In apparatus for grinding the peripheries of discs, the combination of a grinding wheel, and means for rotatably supporting a disc with its periphery presented in grinding relation to said wheel, said supporting means including a spindle mounted in substantially horizontal position and a carrier for said spindle having substantially horizontal bearing surfaces and substantially vertical bearing surfaces forming an open bearing, said last named surfaces engaging the surface of said spindle on the side thereof remote from the grinding surface of the grinding wheel.

5. In apparatus for grinding the peripheries of discs, the combination of a grinding wheel, and means for supporting a disc with its periphery in grinding position with relation to the grinding surface of said grinding wheel, said means including a spindle mounted in substantially horizontal position and a spindle carrier having an open bearing to receive said spindle, said bearing having a substantially horizontal bottom and a substantially vertical wall on the side furthest from said grinding wheel, and a spring for retaining said spindle in said notch and urging the same against said outer substantially vertical wall.

6. In grinding apparatus, the combination of a work spindle, a spindle carrier movable into and out of operating position and having an open bearing to receive the spindle, and a spring arranged to press the spindle against said bearing.

7. In grinding apparatus, the combination of a work-holding spindle, a carrier therefor having an open notched bearing in which said spindle is rotatably mounted, and means for preventing end shake of said spindle, said means including a collar removably clamped on said spindle, said carrier being recessed to receive said collar and having portions on each side of said collar to limit movement thereof endwise of the spindle.

8. In grinding apparatus, the combination of a work-holding spindle, a carrier therefor having a bearing in which said spindle is rotatably mounted, said spindle also being capable of endwise adjustment in said bearing, means for intermittently rotating said spindle, and means for locking said spindle against endwise movement while it is being forwardly rotated, said spindle at other times being free for endwise adjustment.

9. In grinding apparatus, the combination of a spindle, bearings in which the spindle is adjustable endwise, and a driving pulley through which the spindle extends, said driving pulley being held against movement relatively to the carrier endwise of the spindle, and means for causing the driving pulley to clutch the spindle when rotating in one direction to drive the spindle and hold it against endwise movement on the carrier.

10. In grinding apparatus, the combination of a grinding wheel, a work support, and means for causing a relative traversing movement between the grinding wheel and the work carried by said support, including means for applying a predetermined force tending to effect such movement and a retarding device adjustable for varying the rate of such movement during a grinding operation.

11. In grinding apparatus, the combination of a grinding wheel, a work support, and means for causing a relative traversing movement between the grinding wheel and the work carried on said support, including means for applying a predetermined force tending to effect such movement and a retarding device adapted to limit the rate of such movement to a predetermined maximum, but to permit it to vary automatically below such maximum in accordance with the resistance offered by the work to penetration of the wheel.

12. In grinding apparatus, the combination of a rotary grinding wheel, a rotary spindle for holding the article to be ground in grinding relation to the grinding surface of said wheel, and means for rotating said spindle to traverse the work across the grinding wheel, said traversing means including a pulley on the spindle, a flexible member in driving engagement with said pulley, a weight attached to said flexible member tending to rotate said pulley, and a dash pot for resisting the action of said weight.

13. In grinding apparatus, the combination of a rotary grinding wheel, a rotary spindle for holding the article to be ground in grinding relation to the grinding surface of said wheel, and means for rotating said spindle to traverse the work across the grinding wheel, said traversing means including a pulley on the spindle, a flexible member in driving engagement with said pulley, a weight attached to said flexible member tending to rotate said pulley, a dash pot for resisting the action of said weight, and an adjustable valve in said dash pot.

14. In grinding apparatus, the combination of a grinding wheel, a rotary work carrying spindle, and means for rotating said spindle to traverse the work across the grinding wheel, said spindle rotating means including a pulley rotatably mounted on said spindle, clutch mechanism for causing said spindle to rotate with said pulley in one direction of rotation of the latter but permitting said pulley to rotate freely on said spindle in the other direction of rotation thereof, a flexible band wrapped around said pulley, and a weight acting on said band.

15. In grinding apparatus, the combination of a grinding wheel, a rotary work carrying spindle, and means for rotating said spindle to traverse the work across the grinding wheel, said spindle rotating means including a pulley rotatably mounted on said spindle, clutch mechanism for causing said spindle to rotate with said pulley in one direction of rotation of the latter but permitting said pulley to rotate freely on said spindle in the other direction of rotation thereof, a flexible band wrapped around said pulley, a weight connected to one end of said band, and a fluid check device operatively connected to the other end of said band.

16. In grinding apparatus, the combination of a grinding wheel, a rotary work carrying spindle, and means for rotating said spindle to traverse the work across the grinding wheel, said spindle rotating means including a pulley rotatably mounted on said spindle, clutch mechanism for causing said spindle to rotate with said pulley for one direction of rotation of the latter but permitting said pulley to rotate freely on said spindle in the other direction of rotation thereof, a flexible band wrapped around said pulley, a weight connected to one end of said band, and a fluid check device operatively connected to the other end of said band, said fluid check device including a cylinder attached to said band and a stationary piston working in said cylinder.

17. In grinding apparatus, the combination of a grinding wheel, a rotary work carrying spindle and means for rotating said spindle to traverse the work across the grinding wheel, said spindle rotating means including a pulley rotatably mounted on said spindle, clutch mechanism for causing said spindle to rotate with said pulley for one direction of rotation of the latter but permitting said pulley to rotate freely on said spindle in the other direction of rotation thereof, a flexible band wrapped around said pulley, a weight connected to one end of said band, and a fluid check device operatively connected to the other end of said band, said fluid check device including a cylinder attached to said band and a stationary piston working in said cylinder, a by-pass through said piston and an adjustable valve for controlling the passage of fluid through said by-pass.

18. In grinding apparatus, the combination of a grinding wheel, a rotary work carrying spindle, and means for rotating said spindle to traverse the work across the grinding wheel, said spindle rotating means including a pulley rotatably mounted on said spindle, clutch mechanism for causing said spindle to rotate with said pulley for one direction of rotation of the latter but permitting said pulley to rotate freely on said spindle in the other direction of rotation thereof, a flexible band wrapped around said pulley, a weight connected to one end of said band, and a fluid check device operatively connected to the other end of said band, said fluid check device including a cylinder attached to said band and a stationary piston working in said cylinder, a by-pass through said piston and an adjustable valve for controlling the passage of fluid through said by-pass, and a spring for balancing said valve.

19. In grinding apparatus, the combination of a grinding wheel, a plurality of spindle supports adapted to support a work-carrying spindle so as to present the work thereon in grinding positions with relation to said wheel suitable for the performing of different grinding operations upon said work, and a work carrying spindle adapted to be mounted successively on the different supports.

20. In apparatus for grinding the peripheries of discs, the combination of a grinding wheel, a work carrying spindle, a support adapted to removably hold said spindle in a position to present the periphery of the work on said spindle in such relation to said grinding wheel that the latter will grind a cylindrical surface on said periphery, and a second support for said spindle adapted to hold the same so that said grinding wheel will grind a bevel on the work carried by said spindle.

21. In apparatus for grinding the peripheries of discs, the combination of a cup-shaped grinding wheel, a support having a bearing for a spindle, the axis of said bearing lying in a plane parallel to the plane of the grinding surface of said wheel and at a distance from the axis of rotation of said wheel substantially equal to the radius of the grinding surface of said wheel, the axis of said bearing lying substantially at right angles to the axis of rotation of said wheel, and a second support having a bearing the axis of which intersects the plane of the grinding surface of the wheel at an angle, the point of intersection lying near the periphery of the wheel, and a work carrying spindle adapted to be removably and rotatably mounted in the bearings of either of said supports.

22. In apparatus for grinding the peripheries of discs the combination of a grinding wheel, a pivoted arm at one side of said wheel, a crutch pivoted to the free end of said arm, the axes of said arm and said crutch being parallel, and a work-carrying spindle rotatably supported on said crutch, the axis of rotation of said work-carrying spindle lying in a plane intersecting the axes of said pivots substantially at right angles.

23. In apparatus for grinding the peripheries of discs, a base, a grinding wheel rotatably mounted on said base, an arm pivotally mounted on said base at one side of said grinding wheel, means for locking said arm in adjusted position, a crutch pivotally mounted on the free end of said arm to swing about an axis parallel to the pivotal axis of said arm, and a work carrying spindle rotatably supported on said crutch.

24. In grinding apparatus, the combination of a spindle adapted to carry the work to be ground on one of its ends, a sleeve mounted on the other end of said spindle and adjustable longitudinally of the spindle, and a support for the spindle having bearings formed to permit the insertion and removal of the spindle after the application of the sleeve to the spindle and to permit the spindle free longitudinal movement in one direction while limiting its longitudinal movement in the other direction by engagement with said sleeve.

25. In grinding apparatus, a crutch having an open bearing recess therein, a work-carrying spindle adapted to be mounted in said bearing recess, and a sleeve removably mounted on said spindle and adapted to engage a part of said crutch to position said spindle longitudinally in said bearing recess, said sleeve frictionally engaging said spindle and being provided with an adjusting screw.

26. In grinding apparatus, a spindle support having an open bearing recess therein, a spindle rotatably mounted in said support and having its end projecting beyond the end of said support, and a sleeve removably mounted on the projecting end of said spindle and engaging the end of said support for positioning said spindle longitudinally with relation to said support.

27. In grinding apparatus, the combination of a cup-shaped grinding wheel, an arm pivotally mounted at one side of and in front of said wheel, means for clamping said arm in adjusted position, a crutch pivotally mounted on the free end of said arm, means for clamping said crutch in adjusted position, and a work-carrying spindle rotatably mounted on said crutch.

28. In apparatus for grinding the peripheries of discs, the combination of a grinding wheel, and means for rotatably supporting a disk with its periphery presented in grinding relation to said wheel, said supporting means including a spindle, and a support for said spindle having bearing surfaces forming an open bearing, one of said bearing surfaces being substantially parallel to the grinding portion of said wheel and engaging the surface of said spindle on the side thereof remote from said grinding wheel.

29. In apparatus for grinding the peripheries of discs, the combination of a grinding wheel, and means for rotatably supporting a disk with its periphery presented in grinding relation to said wheel, said supporting means including a spindle, a support for said spindle having bearing surfaces forming an open bearing, one of said bearing surfaces being substantially parallel to the grinding portion of said wheel and engaging the surface of said spindle on the side thereof remote from said grinding wheel, and a spring for retaining said spindle in said bearing and urging the same against said surface.

30. In grinding apparatus, the combination of a rotary grinding wheel, means comprising a rotary spindle for holding the article to be ground in grinding relation to the grinding surface of said wheel, means for applying a predetermined force to said spindle to rotate the same, and a fluid check device for resisting the action of said means.

31. In grinding apparatus, the combination of a rotary grinding wheel, means comprising a rotary spindle for holding the article to be ground in grinding relation to the grinding surface of said wheel, means for applying a predetermined force to said spindle to rotate the same, and a fluid check device for resisting the action of said means, said device having an adjustable valve.

32. In grinding apparatus, the combination of a rotary grinding wheel, means comprising a rotary spindle for holding the article to be ground in grinding relation to the grinding surface of said wheel, means for applying a predetermined force to said spindle to rotate the same, and a fluid check device for resisting the action of said means, said fluid check device including a movable cylinder, a stationary piston working in said cylinder and having a by-pass therethrough, and an adjustable valve for controlling the passage of fluid through said by-pass.

33. In grinding apparatus, the combination of a rotary grinding wheel, means comprising a rotary spindle for holding the article to be ground in grinding relation to the grinding surface of said wheel, means for applying a predetermined force to said spindle to rotate the same, and a fluid check device for resisting the action of said means, said fluid check device including a movable cylinder, a stationary piston working in said cylinder and having a by-pass therethrough, an adjustable valve for controlling the passage of fluid through said by-pass, and a spring for balancing said valve.

34. In a grinding machine, a grinding wheel, a work spindle, means for rotating said spindle at a rate varying automatically and inversely with the resistance between the work carried by said spindle and said grinding wheel, and means for preventing rotation of said spindle at a rate in excess of a predetermined maximum.

35. In a grinding machine, a grinding wheel, a work spindle, means, comprising a weight for rotating said spindle at a rate varying automatically and inversely with the resistance between the work carried by said spindle and said grinding wheel, and means, comprising a dash-pot for preventing rotation of said spindle at a rate in excess of a predetermined maximum.

36. A grinding machine, comprising an abrasive wheel, a plurality of work spindles, and means for setting said spindles successively in operative relation to said abrasive wheel, said means comprising a crutch having an open bearing adapted to receive the spindles interchangeably, and means for quickly seating and holding said spindles in said bearing with the work in predetermined relation to the wheel.

37. In grinding apparatus, the combination of a grinding wheel, a work support, and means for causing a relative traversing movement of predetermined length between the grinding wheel and the work carried on the support including means for varying the rate of said traversing movement by indefinitely small amounts without changing the length of the movement.

38. In grinding apparatus, the combination of a grinding wheel, a work support, means for causing a relative traversing movement between the grinding wheel and the work carried on said support, including means tending to apply a force to effect such movement, and retarding means limiting the rate of said movement to a predetermined rate, said retarding means being adjustable to vary said predetermined rate by indefinitely small amounts.

39. A machine for grinding the peripheries of lenses, comprising means for rotating the lens about its optical axis, a continuously rotating grinding wheel having a circular grinding edge engaging the periphery of the lens and set so that the axis of the grinding wheel lies substantially in the median plane of the lens, the circular grinding edge of the wheel lies in a plane parallel to the axis of the lens and the axis of the grinding wheel is distant from the axis of the lens by an amount substantially equal to the radius of the grinding edge, and automatic means for stopping the rotation of the lens after the completion of a grinding operation.

40. In apparatus for grinding the peripheries of discs, the combination of a rotary abrasive wheel and a spindle adapted to carry the disc to be ground, mounted so as to permit a relative approaching movement between the operative surface of the grinding wheel and a disc upon the spindle, means for limiting the extent of such approaching movement, automatic means for causing rotation of the disc at a limited rate, and automatic means for causing a relative approaching movement between the wheel and the disc at a rate so proportioned to the rate of rotation of the disc that the approaching movement is completed before the disc has made a complete revolution.

41. In apparatus for grinding the peripheries of discs, the combination of a rotary abrasive wheel and a spindle adapted to carry the disc to be ground, mounted so as to permit a relative approaching movement between the operative surface of the grinding wheel and a disc upon the spindle, means for limiting the extent of such approaching movement, automatic means for causing rotation of the disc at a limited rate, automatic means for causing a relative approaching movement between the wheel and the disc at a rate so proportioned to the rate of rotation of the disc that the approaching movement is completed before the disc has made a complete revolution, and automatic means for stopping the rotation of the disc after it has made one complete revolution and before it has made two complete revolutions.

In testimony whereof I have hereunto set my hand in the presence of two subscribing witnesses.

WILLIAM TAYLOR.

Witnesses:
ARTHUR PIERCE,
DOROTHY FOSTER.